(12) United States Patent
Oyama et al.

(10) Patent No.: US 10,566,621 B2
(45) Date of Patent: Feb. 18, 2020

(54) LITHIUM-ION SECONDARY BATTERY

(71) Applicant: SUMITOMO OSAKA CEMENT CO., LTD., Tokyo (JP)

(72) Inventors: Masataka Oyama, Yachiyo (JP); Takao Kitagawa, Funabashi (JP)

(73) Assignee: SUMITOMO OSAKA CEMENT CO., LTD, Tokyo (JP)

(*) Notice: Subject to any disclaimer, the term of this patent is extended or adjusted under 35 U.S.C. 154(b) by 256 days.

(21) Appl. No.: 15/463,207

(22) Filed: Mar. 20, 2017

(65) Prior Publication Data

US 2017/0288226 A1 Oct. 5, 2017

(30) Foreign Application Priority Data

Mar. 30, 2016 (JP) .................................. 2016-069260
Jul. 28, 2016 (JP) .................................. 2016-148435

(51) Int. Cl.
| | | |
|---|---|---|
| *H01M 4/58* | (2010.01) | |
| *H01M 10/0525* | (2010.01) | |
| *H01M 4/136* | (2010.01) | |
| *H01M 4/36* | (2006.01) | |
| *H01M 4/62* | (2006.01) | |
| *H01M 4/02* | (2006.01) | |

(52) U.S. Cl.
CPC ......... *H01M 4/5825* (2013.01); *H01M 4/136* (2013.01); *H01M 4/366* (2013.01); *H01M 4/625* (2013.01); *H01M 10/0525* (2013.01); *H01M 2004/021* (2013.01); *H01M 2004/028* (2013.01)

(58) Field of Classification Search
CPC .... H01M 4/5825; H01M 4/136; H01M 4/366; H01M 4/625; H01M 10/0525; H01M 2004/028; H01M 2004/021
See application file for complete search history.

(56) References Cited

U.S. PATENT DOCUMENTS

| | | | |
|---|---|---|---|
| 10,109,861 B2 * | 10/2018 | Oyama | ............... H01M 4/5825 |
| 2009/0087660 A1 | 4/2009 | Suzuki et al. | |
| 2010/0291430 A1 | 11/2010 | Lee et al. | |
| 2012/0088144 A1 | 4/2012 | Lee et al. | |
| 2014/0322613 A1 | 10/2014 | Kitagawa et al. | |

FOREIGN PATENT DOCUMENTS

| | | | |
|---|---|---|---|
| JP | 2006-190528 A | | 7/2006 |
| JP | 2009-087682 A | | 4/2009 |
| JP | 2011-503828 A | | 1/2011 |
| JP | 2013-69566 | * | 4/2013 |
| JP | 2014-216241 A | | 11/2014 |
| JP | 2015-2091 | * | 1/2015 |
| JP | 2015-002091 A | | 1/2015 |
| JP | 2015-099659 A | | 5/2015 |
| JP | 2016-146301 A | | 8/2016 |

* cited by examiner

*Primary Examiner* — Laura Weiner
(74) *Attorney, Agent, or Firm* — Greenblum & Bernstein, P.L.C.

(57) ABSTRACT

A lithium-ion secondary battery including a cathode, an anode, and an electrolyte, in which the lithium-ion secondary battery includes inorganic phosphate particles, and the cathode includes cathode active material particles which include central particles made of $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles.

4 Claims, 1 Drawing Sheet

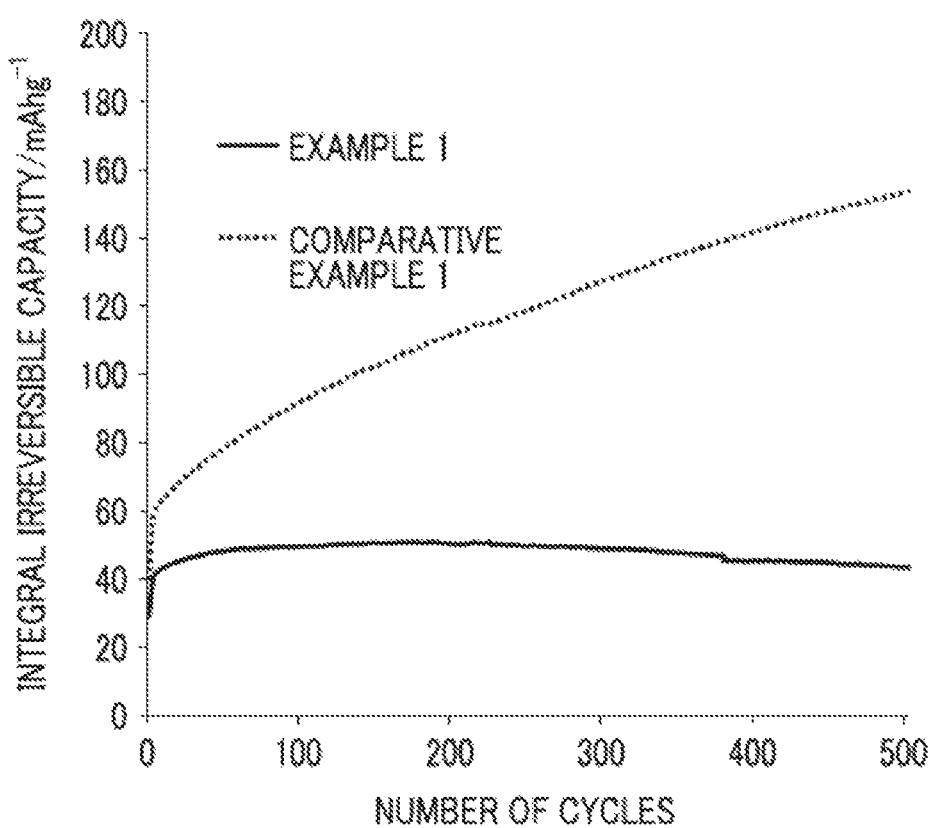

LITHIUM-ION SECONDARY BATTERY

CROSS-REFERENCE TO RELATED APPLICATIONS

This application claims the benefit of Japanese Patent Application No. 2016-069260 filed Mar. 30, 2016 and Japanese Patent Application No. 2016-148435 filed Jul. 28, 2016, the disclosures of which are herein incorporated by reference in its entirety.

BACKGROUND OF THE INVENTION

Field of the Invention

The present invention relates to a lithium-ion secondary battery.

Description of Related Art

In recent years, as batteries anticipated to have a small size and a high capacity and weigh less, non-aqueous electrolyte-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathode materials of lithium-ion secondary batteries, cathode material mixtures including a cathode active material, a binder, and the like are used. As the cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called a current collector.

As electrolytes for lithium-ion secondary batteries, non-aqueous solvents are used. Non-aqueous solvents enable the application of cathode active materials that are oxidized and reduced at a high potential or anode active materials that are oxidized and reduced at a low potential, whereby lithium-ion secondary batteries having a higher voltage can be realized.

These lithium-ion secondary batteries have a small size and a higher energy and weigh less than secondary batteries in the related art such as lead batteries, nickel cadmium batteries, and nickel metal hydride batteries. Therefore, lithium-ion secondary batteries are used not only as small-size power supplies used in portable electronic devices such as mobile phones and notebook personal computers but also as large-size stationary emergency power supplies.

In order to obtain cathode active materials capable of realizing non-aqueous electrolyte secondary batteries being excellent in terms of all of cycle characteristics, preservation characteristics, and continuous charging characteristics, it is disclosed that cathode active materials include a lithium transition metallic oxide and an oxoacid salt, a peak detected in the TEM-EDX analysis of cross sections of cathode active materials, TOF-SIMS of cathode active materials in the depth direction, or XPS of cathode active materials in the depth direction includes at least a peak (A) derived from at least one element selected from the group consisting of phosphorus, sulfur, and boron and a peak (B) derived from at least one element selected from the group of transition metals, and a constitution in which at least one peak (A) and at least one peak (B) satisfy a predetermined relationship is disclosed (for example, refer to Japanese Laid-open Patent Publication No. 2015-099659).

SUMMARY OF THE INVENTION

However, even when the electrode material for a secondary battery disclosed by Patent Document 1 is used, it was not possible to control the degradation of long-term cycle characteristics.

The present invention has been made in consideration of the above-described circumstances, and an object of the present invention is to provide a lithium-ion secondary battery having excellent long-term cycle characteristics.

As a result of intensive studies, the present inventors and the like found that, in a case in which a cathode including cathode active material particles made of a lithium phosphate having an oxidation-reduction potential at 4.2 V (Li/Li+) or lower is applied to a lithium-ion secondary battery, and the lithium-ion secondary battery includes inorganic phosphate particles, it is possible to obtain a lithium-ion secondary battery having excellent long-term cycle characteristics.

The detailed mechanism of the long-term cycle characteristics of the battery being improved when the battery includes inorganic phosphate particles is not clear, but it is assumed that inorganic phosphate particles eluted from the cathode, react with transition metal ions, and suppress the transition metal ions reaching the anode, whereby it is possible to suppress transition metal being eluted from cathode materials.

In addition, as a result of intensive studies, the present inventors and the like found that, in a case in which a process of constant-current charging a lithium-ion secondary battery including a cathode and an anode made of natural graphite at a current value of 2 C until the battery voltage reaches 4.1 V and then discharging the lithium-ion secondary battery at a current value of 2 C until the battery voltage reaches 2 V in an environment of 60° C. is considered as one cycle, in the cycle, when a charge capacity obtained by the constant-current charging at a current value of 2 C until the battery voltage reaches 4.1 V is considered as a charge capacity A, and a discharge capacity obtained by the subsequent discharging at a current value of 2 C until the battery voltage reaches 2 V is considered as a discharge capacity B, lithium-ion secondary batteries in which an integral value obtained by integrating the difference between the discharge capacity B and the charge capacity A (the discharge capacity B−the charge capacity A) in the cycle over 500 cycles is 100 mAh/g or less and the discharge capacity B at the first cycle is 100 mAh/g or more have excellent long-term cycle characteristics. The present invention has been completed on the basis of the above-described idea.

That is, the present invention provides the following means.

A lithium-ion secondary battery of the present invention is a lithium-ion secondary battery including a cathode, an anode, and an electrolyte, in which the lithium-ion secondary battery includes inorganic phosphate particles, and the cathode includes cathode active material particles which include central particles made of $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles.

According to the present invention, it is possible to provide a lithium-ion secondary battery with having excellent long-term cycle characteristics.

BRIEF DESCRIPTION OF THE DRAWINGS

FIG. 1 is a view illustrating changes in integral irreversible capacity values during cycle tests in Example 1 and Comparative Example 1.

DETAILED DESCRIPTION OF THE INVENTION

Embodiments of a lithium-ion secondary battery of the present invention will be described.

Meanwhile, the present embodiment is specific description for better understanding of the gist of the invention and does not limit the present invention unless particularly otherwise described.

Lithium-Ion Secondary Battery

A lithium-ion secondary battery of the present embodiment is a lithium-ion secondary battery including a cathode, an anode, and an electrolyte, in which the lithium-ion secondary battery includes inorganic phosphate particles, and the cathode includes cathode active material particles which include central particles made of $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles.

The inorganic phosphate particles may be included in the cathode, the anode, or the electrolyte, and may be included in other constituent elements that the lithium-ion secondary battery may include. The details of the form of the inorganic phosphate particles being included will be described below.

The details of the cathode, the anode, and the electrolyte that the lithium-ion secondary battery of the present embodiment includes will be described below, and it is possible to provide the following constitution.

The cathode in the present embodiment may include, for example, a current collector made of a metallic foil and a cathode mixture layer formed on the current collector. The anode in the present embodiment may include a variety of anode materials. The cathode in the present embodiment and the anode in the present embodiment can be made to face each other through a separator. As the electrolyte in the present embodiment, a non-aqueous electrolyte can be used, and, generally, a liquid-form electrolyte is used.

Inorganic Phosphate Particles

The inorganic phosphate particles are not particularly limited as long as the inorganic phosphate particles contain an inorganic phosphate and preferably contain at least one element selected from the group consisting of alkali metals and alkali earth metals. The inorganic phosphate particles, furthermore, preferably contain at least one element selected from the group consisting of phosphoric acid, pyrophosphoric acid, and metaphosphoric acid.

The inorganic phosphate particles may be crystalline or amorphous.

The inorganic phosphate particles may contain base metal, semimetal, or transition metal, and the content thereof in the inorganic phosphate particles is preferably in a range in which the transition metal/phosphorus ratio reaches 0.5 or lower in terms of the substance amount ratio (molar ratio) and more preferably in a range in which the transition metal/phosphorus ratio reaches 0.1 or lower. The inorganic phosphate particles may not contain transition metal.

When the transition metal/phosphorus ratio is 0.5 or lower in terms of the molar ratio, it is difficult for alkali metal and alkali earth metal to be intercalated and deintercalated due to the redox of transition metal, and the structural change or the expansion and contraction of the volume of the inorganic phosphate particles is suppressed, and thus mixture electrode structures do not easily break or the like.

The inorganic phosphate particles are preferably represented by $Li_\alpha P_\beta O_\gamma$ ($0 < \alpha \leq 3$, $0 < \beta \leq 2$, $0 < \gamma \leq 4$, $0.5 \leq \alpha/\beta \leq 3.5$) and more preferably $0.9 \leq \alpha/\beta \leq 2.1$. When $Li_\alpha P_\beta O_\gamma$ ($0 < \alpha \leq 3$, $0 < \beta \leq 2$, $0 < \gamma \leq 4$, $0.5 \leq \alpha/\beta \leq 3.5$) is used as the inorganic phosphate particles, it is possible to efficiently suppress transition metal being eluted from the cathode.

The average primary particle diameter of the primary particles of the inorganic phosphate particles is preferably 0.5 μm or more and 75 μm or less and more preferably 0.5 μm or more and 45 μm or less.

When the average primary particle diameter of the primary particles of the inorganic phosphate particles is 0.5 μm or more, it is difficult to obtain a form in which the cathode active material particle surfaces are coated with the inorganic phosphate particles, and thus it is possible to more efficiently suppress transition metal being eluted from the cathode.

On the other hand, when the average primary particle diameter of the primary particles of the inorganic phosphate particles is 75 μm or less, electrodes do not easily become uneven, and thus it is possible to produce uniform electrodes and suppress the current density being biased or the like.

Method for Manufacturing Inorganic Phosphate Particles

As a method for manufacturing the inorganic phosphate particles in the present embodiment, it is possible to use a method of the related art such as a solid-phase method, a liquid-phase method, or a gas-phase method.

The method for manufacturing the inorganic phosphate particles in the present embodiment has, for example, a mixing step of inorganic phosphate particle raw materials, a calcination step of calcinating the obtained inorganic phosphate particles, and a classification step of crushing the obtained inorganic phosphate particles using a crusher and classifying the crushed inorganic phosphate particles.

Mixing Step of Inorganic Phosphate Raw Material

As a method for mixing the raw materials of the inorganic phosphate particles, the raw materials may be mixed together in a solid phase, a liquid phase, or a gas phase, but a method in which the raw materials are uniformly mixed together is preferred. The raw materials are more preferably crushed using a crusher or the like and mixed together since the raw materials can be uniformly mixed together.

The raw materials of the inorganic phosphate particles include at least one of a phosphoric acid source, an alkali metal source, and an alkali earth metal source and, furthermore, may include a poor metal source, a semimetal source, and a transition metal source.

Here, as the phosphoric acid source, phosphoric acid compounds such as phosphoric acid ($H_3PO_4$), ammonium dihydrogen phosphate ($NH_4H_2PO_4$), diammonium phosphate (($NH_4)_2HPO_4$), and phosphono dihydrogen phosphate ($H_4P_2O_7$), phosphates of alkali metal or alkali earth metal, and the like can be preferably used.

As the alkali metal source, phosphates, acetates, sulfates, hydrochlorides, nitrates, hydroxide salts, citrates, and the like which include Li, Na, K, Rb, or the like can be preferably used.

As the alkali earth metal source, phosphates, acetates, sulfates, hydrochlorides, nitrates, hydroxide salts, citrates, and the like which include Be, Mg, Ca, Sr, Ba, or the like can be preferably used.

As the poor metal source, phosphates, acetates, sulfates, hydrochlorides, nitrates, hydroxide salts, citrates, and the like which include Al, Ga, In, Sn, Pb, or the like can be preferably used.

As the semimetal source, phosphates, acetates, sulfates, hydrochlorides, nitrates, hydroxide salts, citrates, and the like which include B, Si, Ge, As, Sb, Te, or the like can be preferably used.

As the transition metal source, phosphates, acetates, sulfates, hydrochlorides, nitrates, hydroxide salts, citrates, and the like which include Sc, Ti, V, Cr, Mn, Fe, Co, Ni, Cu, Zn, Y, Zr, Nb, Mo, Tc, Ru, Rh, Pd, Ag, Cd, Ta, W, or the like can be preferably used.

Calcination Step

Next, the obtained mixture is calcinated at a temperature of preferably 300° C. or higher and 1,000° C. or lower and more preferably 500° C. or higher and 800° C. or lower for 0.1 hours or longer and 40 hours or shorter.

Here, when the calcination temperature is set to 300° C. or higher, it is possible to cause the inorganic phosphate raw materials to be sufficiently reacted and produce inorganic phosphate particles having only a small amount of impurities. On the other hand, when the calcination temperature is set to 1,000° C. or lower, it is possible to prevent the inorganic phosphate particles from being grown to be equal to or larger than the target size, suppress evaporation of, for example, lithium (Li) which is an alkali metal, or prevent the inorganic phosphate particles from becoming amorphous when necessary, and thus it is possible to obtain inorganic phosphate particles having favorable characteristics.

The calcination atmosphere may be an oxidative atmosphere or a non-oxidative atmosphere. The oxidative atmosphere may be the atmosphere or an atmosphere into which oxygen ($O_2$) is introduced so as to have an increased oxygen concentration. The non-oxidative atmosphere is preferably an atmosphere filled with an inert gas such as nitrogen ($N_2$), argon (Ar), or the like.

Crushing Step

Next, in a case in which it is necessary to adjust the particle diameters of the obtained inorganic phosphate, crushing may be carried out. A crushing method may be any one of a wet-type method and a dry-type method. Crushing is preferably carried out at a high crushing intensity so that the inorganic phosphate particles having a primary particle diameter of 75 μm or more disappear. This is because, when the primary particle diameter of the inorganic phosphate particles is 75 μm or less, electrodes do not easily become uneven, and thus it is possible to produce uniform electrodes and suppress the current density being biased or the like.

Classification Step

Next, the inorganic phosphate particles are classified. The classification may be carried out using any one of a wet-type method and a dry-type method. In addition, the inorganic phosphate particles may be classified using an air flow or a sieve. In this case, the inorganic phosphate particles are preferably classified so that the particle diameter of the inorganic phosphate particles reaches 75 μm or less. When the primary particle diameter of the inorganic phosphate particles is 75 μm or less, electrodes do not easily become uneven, and thus it is possible to produce uniform electrodes and suppress the current density being biased or the like.

Form of Inorganic Phosphate Particles being Included

As the form of the inorganic phosphate particles being included, the inorganic phosphate particles may be included in the cathode mixture layer, may be present between the cathode mixture layer and the separator, may be supported by the separator, may be included in the electrolyte, or may be included in the anode mixture layer, and need to be included in one or more places. Among these, the form of the inorganic phosphate particles being included in the cathode mixture layer (being included in the cathode) is preferred.

When the inorganic phosphate particles in the present embodiment play a role of suppressing transition metal being eluted from the cathode, it is possible to realize lithium-ion secondary batteries having excellent stability and safety of long-term cycles.

In a case in which the cathode mixture layer includes inorganic phosphate particles, the cathode mixture layer is preferably made of composite particles in which cathode active material particles are attached to inorganic phosphate particle surfaces.

When the composite particles have a form of the cathode active material particles being attached to the inorganic phosphate particle surfaces instead of a form of an inorganic phosphate being applied to the cathode active material particle surfaces, it is easy to suppress transition metal being eluted from the cathode.

The optimal mixing ratio between the cathode active material particles and the inorganic phosphate particles is determined in accordance with the primary particle diameters of the cathode active material particles, the primary particle diameters of the inorganic phosphate particles, and the like, and the content of the inorganic phosphate particles in the cathode is preferably 0.1 parts by mass or more and 10 parts by mass or less, more preferably 0.2 parts by mass or more and 8 parts by mass or less, still more preferably 0.5 parts by mass or more and 7 parts by mass or less, and far still more preferably 0.5 parts by mass or more and 6 parts by mass or less with respect to 100 parts by mass of the cathode active material particles. When the content of the inorganic phosphate particles is 0.1 parts by mass or more with respect to 100 parts by mass of the cathode active material particles, it is possible to sufficiently suppress transition metal being eluted from the cathode. On the other hand, when the content of the inorganic phosphate particles is 10 parts by mass or less with respect to 100 parts by mass of the cathode active material particles, the inorganic phosphate particles having poor electron conductivity do not impair the electron conduction of the cathode mixture layer, and it is possible to suppress a decrease in the capacity of lithium-ion secondary batteries.

In a case in which the inorganic phosphate particles are included between the cathode mixture layer and the separator, the inorganic phosphate particles are preferably uniformly present in an inorganic phosphate particle layer between the cathode mixture layer and the separator. When the inorganic phosphate particles are uniformly present, unevenness is diminished and it is possible to prevent the current density from being biased and efficiently trap transition metal being eluted from the cathode.

The thickness of the inorganic phosphate particle layer is preferably 0.5 μm or more and 35 μm or less. When the thickness of the inorganic phosphate particle layer is preferably 0.5 μm or more, it is possible to efficiently trap transition metal being eluted from the cathode, and, when the thickness thereof is 35 μm or less, it is possible to decrease the liquid resistance derived from ion migration between the cathode and the anode.

In a case in which the inorganic phosphate particles are included in the electrolyte, the inorganic phosphate particles are preferably uniformly dispersed in the electrolyte. When the inorganic phosphate particles are uniformly dispersed, unevenness is diminished and it is possible to prevent the current density from being biased and efficiently trap transition metal being eluted from the cathode.

In a case in which the inorganic phosphate particles are supported by the separator, the inorganic phosphate particles are preferably uniformly dispersed in the electrolyte. When the inorganic phosphate particles are uniformly dispersed, unevenness is diminished and it is possible to prevent the current density from being biased and efficiently trap transition metal being eluted from the cathode.

Cathode

The cathode in the present embodiment includes cathode active material particles which include central particles made of $Li_xA_yM_zPO_4$ ($0 \le x \le 1.1$, $0.8 \le y \le 1.1$, and $0 \le z \le 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles.

The cathode in the present embodiment includes a current collector made of a metallic foil and a cathode mixture layer formed on the current collector, and the cathode mixture layer preferably includes the cathode active material particles in the present embodiment. The cathode in the present embodiment is preferably obtained by forming the cathode mixture layer on one main surface of the current collector using a cathode material including the cathode active material particles in the present embodiment.

Cathode Active Material Particles

The cathode active material particles have central particles made of $Li_xA_yM_zPO_4$ ($0 \le x \le 1.1$, $0.8 \le y \le 1.1$, and $0 \le z \le 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles and inorganic phosphate particles.

The average primary particle diameter of the cathode active material particles is preferably 10 nm or more and 700 nm or less and more preferably 20 nm or more and 500 nm or less.

When the average primary particle diameter of the cathode active material particles is 10 nm or more, the specific surface area of the cathode active material particles increases, whereby it is possible to suppress an increase in the mass of necessary carbon and suppress a decrease in the charge and discharge capacity of lithium-ion secondary batteries. On the other hand, when the average primary particle diameter of the cathode active material particles is 700 μm or less, it is possible to suppress an increase in time taken for lithium ions or electrons to migrate in the cathode active material particles. Therefore, it is possible to suppress output characteristics being deteriorated due to an increase in the internal resistance of lithium-ion secondary batteries.

Here, the average particle diameter refers to the volume-average particle diameter. The average primary particle diameter of the primary particles of the central particles can be measured using a laser diffraction and scattering particle size distribution measurement instrument or the like. In addition, it is also possible to arbitrarily select multiple primary particles observed using a scanning electron microscope (SEM) and compute the average particle diameter of the primary particles.

Central Particles

The central particles constituting the cathode active material particles in the present embodiment are made of $Li_xA_yM_zPO_4$ ($0 \le x \le 1.1$, $0.8 \le y \le 1.1$, and $0 \le z \le 0.2$; here, A represents at least one element selected from the group consisting of Fe, Mn, Co, and Ni, and M represents at least one element selected from the group consisting of Mg, Ca, Co, Sr, Ba, Ti, Zn, B, Al, Ga, In, Si, Ge, and rare earth elements).

Meanwhile, the rare earth elements refer to 15 elements of La, Ce, Pr, Nd, Pm, Sm, Eu, Gd, Tb, Dy, Ho, Er, Tm, Yb, and Lu which belong to the lanthanum series.

The average primary particle diameter of the primary particles of the central particles constituting the cathode active material particles in the present embodiment is preferably 5 nm or more and 800 nm or less and more preferably 20 nm or more and 500 nm or less.

When the average primary particle diameter of the primary particles of the central particles is 5 nm or more, it is possible to sufficiently coat the surfaces of the primary particles of the central particles with the carbonaceous film. In addition, it is possible to increase the discharge capacity of lithium-ion secondary batteries during high-speed charge and discharge and realize sufficient charge and discharge performance. On the other hand, when the average primary particle diameter of the primary particles of the central particles is 500 nm or less, it is possible to decrease the internal resistance of the primary particles of the central particles. In addition, it is possible to increase the discharge capacity of lithium-ion secondary batteries during high-speed charge and discharge.

The shape of the primary particles of the central particles constituting the cathode active material particles in the present embodiment is not particularly limited, but the shape of the primary particles of the central particles is preferably a spherical shape since it is easy to generate the cathode active material made of spherical, particularly, truly spherical secondary particles.

When the shape of the primary particles of the central particles is a spherical shape, it is possible to decrease the amount of a solvent when cathode material paste is prepared by mixing the cathode material including the cathode active material particles, a binder resin (binding agent), and a solvent. In addition, when the shape of the primary particles of the central particles is a spherical shape, it becomes easy to apply the cathode material paste to current collectors. Furthermore, when the shape of the primary particles of the central particles is a spherical shape, the surface area of the primary particles of the central particles is minimized, and it is possible to minimize the amount of the binder resin (binding agent) blended into the cathode material paste. As a result, it is possible to decrease the internal resistance of cathodes of the present embodiment. In addition, when the shape of the primary particles of the central particles is a spherical shape, it becomes easy to closely pack the cathode active material particles, and thus the amount of the cathode active material particles packed per unit volume of the cathode increases. As a result, it is possible to increase the cathode density, and high-capacity lithium-ion secondary batteries can be obtained.

Carbonaceous Film

The carbonaceous film coats the surfaces of the central particles.

When the surfaces of the central particles are coated with the carbonaceous film, it is possible to improve the electrical conductivity of the cathode active material particles.

The thickness of the carbonaceous film is preferably 0.2 nm or more and 10 nm or less and more preferably 0.5 nm or more and 4 nm or less.

When the thickness of the carbonaceous film is 0.2 nm or more, it is possible to prevent the excessively thin thickness of the carbonaceous film from disabling the formation of films having a desired resistance value. In addition, it is possible to ensure conductive properties suitable for the cathode active material particles. On the other hand, when the thickness of the carbonaceous film is 10 nm or less, it is possible to suppress a decrease in the battery capacity per unit mass of the cathode active material particles.

In addition, when the thickness of the carbonaceous film is 0.2 nm or more and 10 nm or less, it becomes easy to closely pack the cathode active material particles, and thus the amount of the cathode active material particles packed per unit volume of the cathode increases. As a result, it is possible to increase the cathode density, and high-capacity lithium-ion secondary batteries can be obtained.

The amount of carbon in the cathode active material particles is preferably 0.1% by mass or more and 10% by mass or less and more preferably 0.3% by mass or more and 3% by mass or less.

When the amount of carbon is 0.1% by mass or more, the discharge capacity of lithium-ion secondary batteries at a high charge-discharge rate increases, and it is possible to realize sufficient charge and discharge rate performance. On the other hand, when the amount of carbon is 10% by mass or less, it is possible to suppress the battery capacity of lithium-ion secondary batteries per unit mass of the cathode active material particles being decreased more than necessary.

The carbon supporting amount with respect to the specific surface area of the primary particles of the central particles constituting the cathode active material particles ("[the carbon supporting amount]/[the specific surface area of the primary particles of the central particles]"; hereinafter, referred to as "the carbon supporting amount ratio") is preferably 0.01 or more and 0.5 or less and more preferably 0.03 or more and 0.3 or less.

When the carbon supporting amount ratio is 0.01 or more, the discharge capacity of lithium-ion secondary batteries at a high charge-discharge rate increases, and it is possible to realize sufficient charge and discharge rate performance. On the other hand, when the carbon supporting amount ratio" is 0.5 or less, it is possible to suppress the battery capacity of lithium-ion secondary batteries per unit mass of the cathode active material particles being decreased more than necessary.

The specific surface area of the cathode active material particles is preferably 5 $m^2/g$ or more and more preferably 7 $m^2/g$ or more.

When the specific surface area of the cathode material A is 5 $m^2/g$ or more, the coarsening of the cathode active material particles is suppressed, and thus it is possible to increase the diffusion rate of lithium among the particles. Therefore, it is possible to improve the battery characteristics of lithium-ion secondary batteries.

In addition, the upper limit value of the specific surface area of the cathode active material particles is not particularly limited as long as a desired effect can be obtained and may be 50 $m^2/g$ or less and may be 20 $m^2/g$ or less.

In addition, the cathode of the present embodiment is used as cathodes in lithium-ion secondary batteries in which natural graphite is used for the anode, and, when a process of constant-current charging the lithium-ion secondary battery at a current value of 2 C until the battery voltage reaches 4.1 V and then discharging the lithium-ion secondary battery at a current value of 2 C until the battery voltage reaches 2 V in an environment of 60° C. is considered as one cycle, in the cycle, the charge capacity obtained by the constant-current charging at a current value of 2 C until the battery voltage reaches 4.1 V is considered as the charge capacity A, and a discharge capacity obtained by the subsequent discharging at a current value of 2 C until the battery voltage reaches 2 V is considered as the discharge capacity B, the integral value obtained by integrating the difference between the discharge capacity B and the charge capacity A (the discharge capacity B–the charge capacity A) in the cycle over 500 cycles is preferably 100 mAh/g or less and the discharge capacity B at the first cycle is preferably 100 mAh/g or more.

Since the lithium-ion secondary battery of the present embodiment includes the inorganic phosphate particles, the elution of transition metal from the cathode of the present embodiment is suppressed, and thus the integral value obtained by integrating the difference between the discharge capacity B and the charge capacity A (the discharge capacity B–the charge capacity A) in the cycle over 500 cycles is 100 mAh/g or less, the discharge capacity B at the first cycle is 100 mAh/g or more, and lithium-ion secondary batteries in which natural graphite is used for the anode have excellent capacity retention and also have excellent safety or long-term cycle characteristics.

Method for Manufacturing Cathode

A method for manufacturing the cathode of the present embodiment is not particularly limited as long as the cathode active material particles of the present embodiment are used, but is preferably a method in which a cathode mixture layer can be formed on one main surface of a current collector.

First, a method for manufacturing the cathode active material particles will be described.

Method for Manufacturing Cathode Active Material Particles

The cathode of the present embodiment includes at least cathode active material particles.

A method for manufacturing the cathode active material particles in the present embodiment includes, for example, a step of manufacturing cathode active material particles and a precursor of the cathode active material particles, a slurry preparation step of mixing at least one cathode active material particle raw material selected from the group consisting of the cathode active material particles and the precursor of the cathode active material particles, an organic compound which is a carbonaceous film precursor, and water, thereby preparing a slurry, and a calcination step of drying the slurry and calcinating the obtained dried substance in a non-oxidative atmosphere.

Step of Manufacturing Cathode Active Material Particles and Precursor of Cathode Active Material Particles As a method for manufacturing a compound represented by $Li_xA_yM_zPO_4$, it is possible to use a method in the related art such as a solid-phase method, a liquid-phase method, or a gas-phase method. Examples of $Li_xA_yM_zPO_4$ obtained using this method include a particulate substance (hereinafter, in some cases, referred to as "$Li_xA_yM_zPO_4$ particles").

The $Li_xA_yM_zPO_4$ particles can be obtained by, for example, hydrothermally synthesizing a slurry-form mixture obtained by mixing a Li source, an A source, a P source, water, and, if necessary, a M source. According to the hydrothermal synthesis, $Li_xA_yM_zPO_4$ is generated in water in a precipitate form. The obtained precipitate may be a precursor of $Li_xA_yM_zPO_4$. In this case, target $Li_xA_yM_zPO_4$ particles can be obtained by calcinating the precursor of $Li_xA_yM_zPO_4$.

In the hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one element selected from the group consisting of lithium acetate, lithium chloride, and lithium hydroxide is preferably used.

Examples of the A source include chlorides, carboxylate salts, sulfate salts, and the like which include at least one element selected from the group consisting of Fe, Mn, Co, and Ni. For example, in a case in which A in $Li_xA_yM_zPO_4$ is Fe, examples of a Fe source include divalent iron salts such as iron (II) chloride ($FeCl_2$), iron (II) acetate (Fe($CH_3COO)_2$), and iron (II) sulfate ($FeSO_4$). Among these, as the Fe source, at least one element selected from the group consisting of iron (II) chloride, iron (II) acetate, and iron (II) sulfate is preferably used.

Examples of the M source include chlorides, carboxylate salts, sulfate salts, and the like which include at least one element selected from the group consisting of Mg, Ca, Co, Sr, Ba, Ti, Zn, B, Al, Ga, In, Si, Ge, and rare earth elements.

Examples of the P source include phosphoric acid compounds such as phosphoric acid ($H_3PO_4$), ammonium dihydrogen phosphate ($NH_4H_2PO_4$), and diammonium phosphate (($NH_4)_2HPO_4$). Among these, as the P source, at least one element selected from the group consisting of phosphoric acid, ammonium dihydrogen phosphate, and diammonium hydrogen phosphate is preferably used.

Slurry Preparation Step

In the slurry preparation step, since the organic compound which is a carbonaceous film precursor is interposed among the cathode active material particles and the components are uniformly mixed together, the surfaces of the cathode active material particles can be evenly coated with the organic compound.

Furthermore, in the calcination step, the organic compound that coats the surfaces of the cathode active material particles carbonizes, thereby obtaining the cathode material including the cathode active material particles uniformly coated with the carbonaceous film.

The organic compound that is used in the method for manufacturing the cathode active material particles in the present embodiment is not particularly limited as long as the compound is capable of forming the carbonaceous film on the surfaces of the cathode active material particles. Examples of the organic compound include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols such as ethylene glycol, trivalent alcohols such as glycerin, and the like.

In the slurry preparation step, the cathode active material particle raw material and the organic compound are dissolved or dispersed in water, thereby preparing a homogeneous slurry.

When these raw materials are dissolved or dispersed in water, it is also possible to add a dispersant.

A method for dissolving or dispersing the cathode active material particle raw material and the organic compound in water is not particularly limited as long as the cathode active material particle raw material is dispersed in water, and the organic compound are dissolved or dispersed in water. The above-described method is preferably a method in which a medium stirring-type dispersing apparatus that stirs medium particles at a high speed such as a planetary ball mill, an oscillation ball mill, a bead mill, a paint shaker, or an attritor is used.

When the cathode active material particle raw material and the organic compound are dissolved or dispersed in water, it is preferable to disperse the cathode active material particle raw material in water in a primary particle form, then, add the organic compound to water, and stir the organic compound so as to be dissolved or dispersed. In such a case, the surfaces of the primary particles of the cathode active material particle raw material are easily coated with the organic compound. Therefore, the organic compound is uniformly dispersed on the surfaces of the primary particles of the cathode active material particle raw material, and consequently, the surfaces of the primary particles of the cathode active material particles are coated with the carbonaceous film derived from the organic compound.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 500° C. or higher and 1,000° C. or lower and more preferably 600° C. or higher and 1,000° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the dried substance, a reducing atmosphere including approximately several percentages by volume of a reducing gas such as hydrogen ($H_2$) is preferred. In addition, for the purpose of removing organic components evaporated in the non-oxidative atmosphere during calcination, a susceptible or burnable gas such as oxygen ($O_2$) may be introduced into the non-oxidative atmosphere.

Here, when the calcination temperature is set to 500° C. or higher, it is easy for the organic compound in the dried substance to be sufficiently decomposed and reacted, and the organic compound is easily and sufficiently carbonized. As a result, it is easy to prevent the generation of a high-resistance decomposed substance of the organic compound in the obtained agglomerate. Meanwhile, when the calcination temperature is set to 1,000° C. or lower, lithium (Li) in the cathode active material particle raw material is not easily evaporated, and the cathode active material particles being grown to be equal to or larger than the target size is suppressed. As a result, in a case in which a lithium-ion secondary battery including a cathode including the cathode material of the present embodiment is produced, it is possible to prevent the discharge capacity at a high charge-discharge rate from becoming low, and it is possible to realize a lithium-ion secondary battery having sufficient charge and discharge rate performance.

By means of the above-described steps, the cathode active material particles in which the surfaces of the primary particles of the cathode active material particles are coated with carbon (the carbonaceous film) generated by the thermal decomposition of the organic compound in the dried substance can be obtained.

As described above, the lithium-ion secondary battery of the present embodiment includes the inorganic phosphate particles. The inorganic phosphate particles may be included in the cathode mixture layer, may be present between the cathode mixture layer and the separator, may be supported by the separator, may be included in the electrolyte, or may be included in the anode mixture layer, and need to be included in one or more places.

In a case in which the inorganic phosphate particles are included in the cathode, the cathode active material particles and the inorganic phosphate particles may be mixed together before the preparation of the cathode material paste or the cathode active material particles and the inorganic phosphate particles may be mixed together during the preparation of the cathode material paste.

A method for mixing the cathode active material particles and the inorganic phosphate particles is not particularly limited as long as the cathode active material particles and the inorganic phosphate particles can be uniformly mixed together; however, in a case in which the cathode active material particles and the inorganic phosphate particles are mixed together before the preparation of the cathode material paste, a mixing method using an air flow is preferred since it is possible to suppress the cathode active material particles (central particles, primary particles) being damaged. In addition, mixing using an air flow such as dried air or dried inert gas is more preferred since the adsorption of moisture to the cathode active material particles and the inorganic phosphate particles is prevented.

Preparation of Cathode Material Paste

As the method for manufacturing the cathode of the present embodiment, for example, the cathode material including the cathode active material particles of the present embodiment, a binding agent made of a binder resin, and a solvent are mixed together, thereby preparing cathode material paste. At this time, the cathode material may be a mixture of the cathode active material particles and the inorganic phosphate particles, and, to the cathode material paste in the present embodiment, a conductive auxiliary agent such as carbon black or inorganic phosphate particles may be added as necessary.

Binding Agent for Preparing Cathode Material Paste

As the binding agent, that is, the binder resin, for example, a polytetrafluoroethylene (PTFE) resin, a polyvinylidene fluoride (PVdF) resin, fluorine rubber, or the like is preferably used.

The blending amount of the binding agent used to prepare the cathode material paste is not particularly limited and is, for example, preferably 1 part by mass or more and 30 parts by mass or less and more preferably 3 parts by mass or more and 20 parts by mass or less with respect to 100 parts by mass of the cathode material for a lithium-ion secondary battery.

When the blending amount of the binding agent is 1 part by mass or more, it is possible to sufficiently increase the binding property between the cathode mixture layer and the current collector. Therefore, it is possible to prevent the cathode mixture layer from being cracked or dropped during the formation of the cathode mixture layer by means of rolling or the like. In addition, it is possible to prevent the cathode mixture layer from being peeled off from the current collector in a process of charging and discharging lithium-ion secondary batteries and prevent the battery capacity or the charge-discharge rate from being decreased. On the other hand, when the amount of the binding agent blended is 30 parts by mass or less, it is possible to prevent the internal resistance of the cathode material for a lithium-ion secondary battery from being decreased and prevent the battery capacity at a high charge-discharge rate from being decreased.

Conductive Auxiliary Agent

The conductive auxiliary agent is not particularly limited, and, for example, at least one element selected from the group consisting of fibrous carbon such as acetylene black (AB), KETJEN BLACK, furnace black, vapor-grown carbon fiber (VGCF), and carbon nanotube is used.

Solvent for Preparing Cathode Material Paste

The solvent that is used in the cathode material paste including the cathode active material particles of the present embodiment is appropriately selected depending on the properties of the binding agent. When the solvent is appropriately selected, it is possible to facilitate the cathode material paste to be applied to substances to be coated such as current collectors.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidone (NMP), glycols such as ethylene glycol, diethylene glycol, and propylene glycol, and the like. These solvents may be used singly, or a mixture of two or more solvents may be used.

The content rate of the solvent in the cathode material paste is preferably 50% by mass or more and 70% by mass or less and more preferably 55% by mass or more and 65% by mass or less in a case in which the total mass of the cathode active material particles of the present embodiment, the binding agent, and the solvent is set to 100% by mass.

When the content rate of the solvent in the cathode material paste is in the above-described range, it is possible to obtain cathode material paste having excellent cathode formability and excellent battery characteristics.

A method for mixing the cathode material including the cathode active material particles of the present embodiment, the binding agent, the conductive auxiliary agent, the inorganic phosphate particles, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The cathode material paste is applied to one main surface of the current collector so as to form a coated film, and then this coated film is dried, thereby obtaining the current collector having a coated film made of a mixture of the cathode material and the binding agent formed on one main surface.

After that, the coated film is pressed by pressure and is dried, thereby producing a cathode having a cathode mixture layer on one main surface of the current collector.

Inorganic Phosphate Particle Layer

To the lithium-ion secondary battery of the present embodiment, in addition to the cathode, the inorganic phosphate particles may be added, and, for example, an inorganic phosphate particle layer may be formed on the cathode mixture layer.

Preparation of Inorganic Phosphate Particle Paste

As a method for producing the inorganic phosphate particle layer in the present embodiment, for example, the inorganic phosphate particles in the present embodiment, a binding agent made of a binder resin, and a solvent are mixed together, thereby preparing inorganic phosphate particle paste.

Binding Agent for Preparing Inorganic Phosphate Particle Paste

As the binding agent, that is, the binder resin, for example, a polytetrafluoroethylene (PTFE) resin, a polyvinylidene fluoride (PVdF) resin, fluorine rubber, or the like is preferably used.

The blending amount of the binding agent used to prepare the inorganic phosphate particle paste is not particularly limited and is, for example, preferably 1 part by mass or more and 30 parts by mass or less and more preferably 3 parts by mass or more and 20 parts by mass or less with respect to 100 parts by mass of the inorganic phosphate particles.

When the blending amount of the binding agent is 1 part by mass or more, it is possible to sufficiently increase the binding property between the inorganic phosphate particles. Therefore, it is possible to prevent the inorganic phosphate particle layer from being cracked or dropped during the formation of the inorganic phosphate particle layer by means of rolling or the like. When the blending amount of the binding agent is 30 parts by mass or less, it is possible to decrease the liquid resistance derived from ion migration between the cathode and the anode and prevent the battery capacity at a high charge-discharge rate from being decreased.

Solvent for Preparing Inorganic Phosphate Particle Paste

The solvent that is used in the inorganic phosphate particle paste including the inorganic phosphate particles of the present embodiment is appropriately selected depending on the properties of the binding agent. When the solvent is appropriately selected, it is possible to facilitate the cathode material paste to be applied to substances to be coated such as current collectors.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetylacetone, and cyclohexanone; amides such as dimethyl formamide, N,N-dimethylacetoacetamide, and N-methyl-2-pyrrolidone (NMP); glycols such as ethylene glycol, diethylene glycol, and propylene glycol, and the like. These solvents may be used singly, or a mixture of two or more solvents may be used.

The content rate of the solvent in the inorganic phosphate particle paste is preferably 50% by mass or more and 70% by mass or less and more preferably 55% by mass or more and 65% by mass or less in a case in which the total mass of the inorganic phosphate particles of the present embodiment, the binding agent, and the solvent is set to 100% by mass.

When the content rate of the solvent in the inorganic phosphate particle paste is in the above-described range, the property of forming the inorganic phosphate particle layer is excellent, and it is easy to uniformly disperse the inorganic phosphate particles and the binding agent, and thus it is possible to efficiently trap transition metal eluted from the cathode.

A method for mixing the inorganic phosphate particles, the binding agent, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The inorganic phosphate particle paste is applied to the cathode mixture layer so as to form a coated film, and then this coated film is dried, thereby forming a coated film made of a mixture of the inorganic phosphate particles and the binding agent on the cathode mixture layer.

After that, the coated film is pressed by pressure and is dried, thereby producing a cathode/inorganic phosphate particle layer having the cathode mixture layer on one main surface of the current collector and having the inorganic phosphate particle paste on the cathode mixture layer.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

The anode material may include the inorganic phosphate particles. In a case in which the anode material includes the inorganic phosphate particles, the content of the inorganic phosphate particles in the anode material can be set to 0.1% by mass or more and 10% by mass or less and is preferably 0.2% by mass or more and 10% by mass or less, more preferably 0.4% by mass or more and 7% by mass or less, and still more preferably 0.5% by mass or more and 7% by mass or less.

Electrolyte

The electrolyte is not particularly limited, but is preferably a non-aqueous electrolyte, and examples thereof include electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

The electrolyte may include the inorganic phosphate particles. In a case in which the electrolyte includes the inorganic phosphate particles, the content of the inorganic phosphate particles in the electrolyte can be set to 0.02% by mass or more and 1.2% by mass or less and is preferably 0.04% by mass or more and 0.8% by mass or less of the mass of the electrolyte. When the content thereof is 0.02% by mass or more, it is possible to efficiently trap transition metal being eluted from the cathode, and, when the content thereof is 1.2% by mass or less, it is possible to decrease the liquid resistance derived from ion migration between the cathode and the anode.

Separator

As the separator, it is possible to use, for example, porous propylene. In addition, instead of the non-aqueous electrolyte and the separator, a solid electrolyte may be used.

In a case in which the lithium-ion secondary battery of the present embodiment includes the cathode for a lithium-ion secondary battery of the present embodiment as the cathode, the oxidation decomposition of the electrolyte and the generation of gas is suppressed, and the stability and safety of long-term cycles are excellent.

The separator may include the inorganic phosphate particles. In a case in which the separator includes the inorganic phosphate particles, the content of the inorganic phosphate particles in the separator can be set to 0.5% by mass or more and 30% by mass or less and is preferably 1% by mass or more and 20% by mass or less. When the content thereof is 0.5% bymass or more, it is possible to efficiently trap transition metal being eluted from the cathode, and, when the content thereof is 30% by mass or less, it is possible to decrease the liquid resistance derived from ion migration between the cathode and the anode.

EXAMPLES

Hereinafter, the present invention will be more specifically described using examples and comparative examples, but the present invention is not limited to the following examples.

Example 1

Synthesis of Cathode Active Material Particles

Lithium phosphate ($Li_3PO_4$) (2 mol) and iron (II) sulfate ($FeSO_4$) (2 mol) were mixed into water (2 L (liters)) so that the total amount reached 4 L (liters), thereby preparing a homogeneous slurry-form mixture. The obtained mixture was stored in a pressure-resistant airtight container having a capacity of 8 L (liters) and was hydrothermally synthesized at 180° C. for one hour, thereby generating a precipitate. The obtained precipitate was washed with water, thereby obtaining a cake-form precursor of cathode active material particles.

Next, a polyethylene glycol (5.5 g) as the organic compound and zirconia balls (500 g) having a diameter of 5 mm as medium particles were mixed into this precursor of the cathode active material particles (150 g in terms of solid contents), and a dispersion treatment was performed in a ball mill for 12 hours, thereby preparing a homogeneous slurry. The prepared slurry was sprayed in the atmosphere at 180° C. and dried, thereby obtaining a granulated body constituted of $LiFePO_4$ coated with the organic compound having an average particle diameter of 6 μm.

The obtained granulated body was calcinated in a non-oxidative gas atmosphere for one hour at 700° C. and then was held at 40° C. for 30 minutes, thereby obtaining $LiFePO_4$ having a conductive carbonaceous film (cathode active material particles A1). The average primary particle diameter of the cathode active material particles A1 was 150 nm.

The average primary particle diameter of the cathode active material particles was measured by averaging the lengths of the long sides of randomly-selected 100 primary particles in an image captured using a scanning electron microscope (SEM), and the average primary particle diameter (D50) of the inorganic phosphate particles was measured using an LB-550 manufactured by Horiba, Ltd. and an SZ-100 manufactured by Horiba, Ltd.

Synthesis of Inorganic Phosphate Particles

Phosphoric acid ($H_3PO_4$) (0.5 mol) and lithium carbonate ($Li_2CO_3$) (0.5 mol) were mixed into water (500 mL (milliliter)), thereby preparing a homogeneous slurry-form mixture. The prepared mixture was heated at 150° C. for one night so as to evaporate moisture, thereby drying the mixture. The dried mixture was calcinated in the atmosphere at 600° C. for 12 hours, thereby obtaining inorganic phosphate particles made of $Li_4P_2O_7$.

Next, the obtained inorganic phosphate particles were classified using a stainless steel sieve having a mesh of 45 μm, thereby obtaining $Li_4P_2O_7$ having a particle diameter of 45 μm or less (inorganic phosphate particles B1).

The average primary particle diameter of the inorganic phosphate particles B1 was 18 μm.

Mixing of Cathode Active Material Particles and Inorganic Phosphate Particles

The cathode active material particles A1 and the inorganic phosphate particles B1 were uniformly mixed together so that the mass of the inorganic phosphate particles B1 with respect to the cathode active material particles A1 (100 parts by mass) (the amount shown in the column of "the amount of (B) with respect to (A) (100 parts by mass)" in Table 1) reached 5.3 parts by mass, and the obtained powder was considered as a cathode material for a lithium-ion secondary battery of Example 1 (cathode material C1).

Production of Lithium-Ion Secondary Battery

The cathode material C1, polyvinylidene fluoride (PVdF) as a binding agent, and acetylene black (AB) as a conductive auxiliary agent were added to N-methyl-2-pyrrolidone (NMP) which was a solvent so that the mass ratio (the cathode material C1/AB/PVdF) in paste reached 90:5:5, and the components were mixed together, thereby preparing cathode material paste (for the cathode).

The prepared cathode material paste (for the cathode) was applied onto the surface of a 30 μm-thick aluminum foil (current collector) so as to form a coated film, and the coated film was dried, thereby forming a cathode mixture layer on the surface of the aluminum foil, and the thickness of the cathode mixture layer was adjusted so that the capacity ratio between the cathode and the anode reached 1.2 (the anode/the cathode).

After that, the cathode mixture layer was pressed by a predetermined pressure so that the cathode density reached 2.0 g/mL, and a tetragonal piece having a cathode area of 9 $cm^2$ was obtained by means of punching using a forming machine, thereby producing a cathode of Example 1.

Next, natural graphite as an anode active material, styrene butadiene rubber (SBR) as a binding agent, and carboxymethyl cellulose (CMC) as a viscosity-adjusting material were added to pure water which was a solvent so that the mass ratio (natural graphite/SBR/CMC) in paste reached 98:1:1, and the components were mixed together, thereby preparing anode material paste (for the anode).

The prepared anode material paste (for the anode) was applied onto the surface of a 10 μm-thick copper foil (current collector) so as to form a coated film, and the coated film was dried, thereby forming an anode mixture layer on the surface of the copper foil. The coating thickness was adjusted so that the weight of the anode mixture layer reached 4.4 mg/$cm^2$. The anode mixture layer was pressed by a predetermined pressure so that the anode density reached 1.42 g/mL, and then a tetragonal piece having an anode area of 9.6 cm² was obtained by means of punching using a forming machine, thereby producing an anode of Example 1.

The produced cathode and anode were made to face each other through a 25 μm-thick polypropylene separator, were immersed into a 1 M LiPF$_6$ solution (0.5 mL) as an electrolyte, and then was sealed with a laminate film, thereby producing a lithium-ion secondary battery of Example 1. As the LiPF$_6$ solution, a solution obtained by mixing ethylene carbonate and ethyl methyl carbonate so that the volume ratio reached 1:1 was used.

Example 2

Synthesis of Cathode Active Material Particles

Cathode active material particles A2 of Example 2 were obtained in the same manner as in Example 1.

Synthesis of Inorganic Phosphate Particles

Inorganic phosphate particles B2 of Example 2 were obtained in the same manner as in Example 1.

Mixing of Cathode Active Material Particles and Inorganic Phosphate Particles

The cathode active material particles A2 and the inorganic phosphate particles B2 were uniformly mixed together so that the mass of the inorganic phosphate particles B2 with respect to the cathode active material particles A2 (100 parts by mass) reached 1 part by mass, and the obtained powder was considered as a cathode material for a lithium-ion secondary battery of Example 2 (cathode material C2).

Production of Lithium-Ion Secondary Battery

A lithium-ion secondary battery of Example 2 was produced in the same manner as in Example 1 except for the fact that the cathode material C2 of Example 2 was used instead of the cathode material C1.

Example 3

Synthesis of Cathode Active Material Particles

Cathode active material particles A3 of Example 3 were obtained in the same manner as in Example 1.

Synthesis of Inorganic Phosphate Particles

Phosphoric acid (H$_3$PO$_4$) (0.5 mol) and lithium carbonate (Li$_2$CO$_3$) (0.75 mol) were mixed into water (500 mL (milliliter)), thereby preparing a homogeneous slurry-form mixture. The prepared mixture was heated at 150° C. for one night so as to evaporate moisture, thereby drying the mixture. The dried mixture was calcinated in the atmosphere at 600° C. for 12 hours, thereby obtaining inorganic phosphate particles made of Li$_3$PO$_4$.

Next, the obtained inorganic phosphate particles were classified using a stainless steel sieve having a mesh of 45 μm, thereby obtaining Li$_3$PO$_4$ having a particle diameter of 45 μm or less (inorganic phosphate particles B3).

The average primary particle diameter of the inorganic phosphate particles B3 was 27 μm.

Mixing of Cathode Active Material Particles and Inorganic Phosphate Particles

The cathode active material particles A3 and the inorganic phosphate particles B3 were uniformly mixed together so that the mass of the inorganic phosphate particles B3 with respect to the cathode active material particles A3 (100 parts by mass) reached 5.3 parts by mass, and the obtained powder was considered as a cathode material for a lithium-ion secondary battery of Example 3 (cathode material C3).

Production of Lithium-Ion Secondary Battery

A lithium-ion secondary battery of Example 3 was produced in the same manner as in Example 1 except for the fact that the cathode material C3 of Example 3 was used instead of the cathode material C1.

Example 4

Synthesis of Cathode Active Material Particles

Cathode active material particles A4 of Example 4 were obtained in the same manner as in Example 1.

Synthesis of Inorganic Phosphate Particles

Inorganic phosphate particles B4 of Example 4 were obtained in the same manner as in Example 3.

Mixing of Cathode Active Material Particles and Inorganic Phosphate Particles

The cathode active material particles A4 and the inorganic phosphate particles B4 were uniformly mixed together so that the mass of the inorganic phosphate particles B4 with respect to the cathode active material particles A4 (100 parts by mass) reached 1 part by mass, and the obtained powder was considered as a cathode material for a lithium-ion secondary battery of Example 4 (cathode material C4).

Production of Lithium-Ion Secondary Battery

A lithium-ion secondary battery of Example 4 was produced in the same manner as in Example 1 except for the fact that the cathode material C4 of Example 4 was used instead of the cathode material C1.

Example 5

Synthesis of Cathode Active Material Particles

Cathode active material particles A5 of Example 5 were obtained in the same manner as in Example 1.

Synthesis of Inorganic Phosphate Particles

Phosphoric acid (H$_3$PO$_4$) (0.5 mol) and lithium citrate (Li$_3$C$_6$H$_5$O$_7$) (0.17 mol) were mixed into water (500 mL (milliliter)), thereby preparing a homogeneous slurry-form mixture. The prepared mixture was heated at 150° C. for one night so as to evaporate moisture, thereby drying the mixture. The dried mixture was calcinated in a non-oxidative atmosphere at 600° C. for 12 hours, thereby obtaining inorganic phosphate particles made of LiPO$_3$.

Next, the obtained inorganic phosphate particles were classified using a stainless steel sieve having a mesh of 45 μm, thereby obtaining LiPO$_3$ having a particle diameter of 45 μm or less (inorganic phosphate particles B5).

The average primary particle diameter of the inorganic phosphate particles B5 was 21 μm.

Mixing of Cathode Active Material Particles and Inorganic Phosphate Particles

The cathode active material particles A5 and the inorganic phosphate particles B5 were uniformly mixed together so that the mass of the inorganic phosphate particles B5 with respect to the cathode active material particles A5 (100 parts by mass) reached 5.3 parts by mass, and the obtained powder was considered as a cathode material for a lithium-ion secondary battery of Example 5 (cathode material C5).

Production of Lithium-Ion Secondary Battery

A lithium-ion secondary battery of Example 5 was produced in the same manner as in Example 1 except for the fact that the cathode material C5 of Example 5 was used instead of the cathode material C1.

Example 6

Synthesis of Cathode Active Material Particles

Cathode active material particles A6 of Example 6 were obtained in the same manner as in Example 1.

Synthesis of Inorganic Phosphate Particles

Inorganic phosphate particles B6 of Example 6 were obtained in the same manner as in Example 5.

Mixing of Cathode Active Material Particles and Inorganic Phosphate Particles

The cathode active material particles A6 and the inorganic phosphate particles B6 were uniformly mixed together so that the mass of the inorganic phosphate particles B6 with respect to the cathode active material particles A6 (100 parts by mass) reached 1 part by mass, and the obtained powder was considered as a cathode material for a lithium-ion secondary battery of Example 6 (cathode material C6).

Production of Lithium-Ion Secondary Battery

A lithium-ion secondary battery of Example 6 was produced in the same manner as in Example 1 except for the fact that the cathode material C6 of Example 6 was used instead of the cathode material C1.

Example 7

Synthesis of Cathode Active Material Particles

Cathode active material particles A7 of Example 7 were obtained in the same manner as in Example 1.

Synthesis of Inorganic Phosphate Particles

Phosphoric acid ($H_3PO_4$) (0.5 mol) and lithium carbonate ($Li_2CO_3$) (0.25 mol) were mixed into water (500 mL (milliliter)), thereby preparing a homogeneous slurry-form mixture. The prepared mixture was heated at 150° C. for one night so as to evaporate moisture, thereby drying the mixture. The dried mixture was calcinated in the atmosphere at 800° C. for 12 hours, thereby obtaining inorganic phosphate particles made of $LiPO_3$.

Next, the obtained inorganic phosphate particles were classified using a stainless steel sieve having a mesh of 45 µm, thereby obtaining $LiPO_3$ having a particle diameter of 45 µm or less (inorganic phosphate particles B7).

The average primary particle diameter of the inorganic phosphate particles B7 was 13 µm.

Mixing of Cathode Active Material Particles and Inorganic Phosphate Particles

The cathode active material particles A7 and the inorganic phosphate particles B7 were uniformly mixed together so that the mass of the inorganic phosphate particles B7 with respect to the cathode active material particles A7 (100 parts by mass) reached 5.3 parts by mass, and the obtained powder was considered as a cathode material for a lithium-ion secondary battery of Example 7 (cathode material C7).

Production of Lithium-Ion Secondary Battery

A lithium-ion secondary battery of Example 7 was produced in the same manner as in Example 1 except for the fact that the cathode material C7 of Example 7 was used instead of the cathode material C1.

Example 8

Synthesis of Cathode Active Material Particles

Cathode active material particles A8 of Example 8 were obtained in the same manner as in Example 1.

Synthesis of Inorganic Phosphate Particles

Inorganic phosphate particles B8 of Example 8 were obtained in the same manner as in Example 7.

Mixing of Cathode Active Material Particles and Inorganic Phosphate Particles

The cathode active material particles A8 and the inorganic phosphate particles B8 were uniformly mixed together so that the mass of the inorganic phosphate particles B8 with respect to the cathode active material particles A8 (100 parts by mass) reached 1 part by mass, and the obtained powder was considered as a cathode material for a lithium-ion secondary battery of Example 8 (cathode material C8).

Production of Lithium-Ion Secondary Battery

A lithium-ion secondary battery of Example 8 was produced in the same manner as in Example 1 except for the fact that the cathode material C8 of Example 8 was used instead of the cathode material C1.

Example 9

Synthesis of Cathode Active Material Particles

Lithium phosphate ($Li_3PO_4$) (2 mol), magnesium (II) sulfate ($MnSO_4$) (1.4 mol), and iron (II) sulfate ($FeSO_4$) (0.6 mol) were mixed into water (2 L (liters)) so that the total amount reached 4 L (liters), thereby preparing a homogeneous slurry-form mixture. The prepared mixture was stored in a pressure-resistant airtight container having a capacity of 8 L (liters) and was hydrothermally synthesized at 180° C. for one hour, thereby generating a precipitate. The generated precipitate was washed with water, thereby obtaining a cake-form precursor of a cathode active material.

A polyethylene glycol (5.5 g) as the organic compound and zirconia balls (500 g) having a diameter of 5 mm as medium particles were mixed into the obtained precursor of the cathode active material (150 g in terms of solid contents), and a dispersion treatment was performed in a ball mill for 12 hours, thereby preparing a homogeneous slurry.

The prepared slurry was sprayed in the atmosphere at 180° C. and dried, thereby obtaining a granulated body constituted of $LiMn_{0.7}Fe_{0.3}PO_4$ coated with the organic compound having an average particle diameter of 6 µm.

The obtained granulated body was calcinated in a non-oxidative gas atmosphere for one hour at 700° C. and then was held at 40° C. for 30 minutes, thereby obtaining $LiMn_{0.7}Fe_{0.3}PO_4$ having a conductive carbonaceous film (cathode active material particles A9).

The average primary particle diameter of the cathode active material particles A9 was 100 nm.

Synthesis of Inorganic Phosphate Particles

Inorganic phosphate particles B9 of Example 9 were obtained in the same manner as in Example 1.

Mixing of Cathode Active Material Particles and Inorganic Phosphate Particles

The cathode active material particles A9 and the inorganic phosphate particles B9 were uniformly mixed together so that the mass of the inorganic phosphate particles B9 with respect to the cathode active material particles A9 (100 parts by mass) reached 5.3 parts by mass, and the obtained powder was considered as a cathode material for a lithium-ion secondary battery of Example 9 (cathode material C9).

Production of Lithium-Ion Secondary Battery

A lithium-ion secondary battery of Example 9 was produced in the same manner as in Example 1 except for the fact that the cathode material C9 of Example 9 was used instead of the cathode material C1.

Example 10

Synthesis of Cathode Active Material Particles

Cathode active material particles A10 of Example 10 were obtained in the same manner as in Example 9.

Synthesis of Inorganic Phosphate Particles

Inorganic phosphate particles B10 of Example 10 were obtained in the same manner as in Example 3.

Mixing of Cathode Active Material Particles and Inorganic Phosphate Particles

The cathode active material particles A10 and the inorganic phosphate particles B10 were uniformly mixed together so that the mass of the inorganic phosphate particles B10 with respect to the cathode active material particles A10 (100 parts by mass) reached 5.3 parts by mass, and the obtained powder was considered as a cathode material for a lithium-ion secondary battery of Example 10 (cathode material C10).

Production of Lithium-Ion Secondary Battery

A lithium-ion secondary battery of Example 10 was produced in the same manner as in Example 1 except for the fact that the cathode material C10 of Example 10 was used instead of the cathode material C1.

Example 11

Synthesis of Cathode Active Material Particles

Cathode active material particles A11 of Example 11 were obtained in the same manner as in Example 9.

Synthesis of Inorganic Phosphate Particles

Inorganic phosphate particles B11 of Example 11 were obtained in the same manner as in Example 5.

Mixing of Cathode Active Material Particles and Inorganic Phosphate Particles

The cathode active material particles A11 and the inorganic phosphate particles B11 were uniformly mixed together so that the mass of the inorganic phosphate particles B11 with respect to the cathode active material particles A11 (100 parts by mass) reached 5.3 parts by mass, and the obtained powder was considered as a cathode material for a lithium-ion secondary battery of Example 11 (cathode material C11).

Production of Lithium-Ion Secondary Battery

A lithium-ion secondary battery of Example 11 was produced in the same manner as in Example 1 except for the fact that the cathode material C11 of Example 11 was used instead of the cathode material C1.

Example 12

Synthesis of Cathode Active Material Particles

Cathode active material particles A12 of Example 12 were obtained in the same manner as in Example 9.

Inorganic phosphate particles B12 of Example 12 were obtained in the same manner as in Example 7.

Mixing of Cathode Active Material Particles and Inorganic Phosphate Particles

The cathode active material particles A12 and the inorganic phosphate particles B12 were uniformly mixed together so that the mass of the inorganic phosphate particles B12 with respect to the cathode active material particles A12 (100 parts by mass) reached 5.3 parts by mass, and the obtained powder was considered as a cathode material for a lithium-ion secondary battery of Example 12 (cathode material C12).

Production of Lithium-Ion Secondary Battery

A lithium-ion secondary battery of Example 12 was produced in the same manner as in Example 1 except for the fact that the cathode material C12 of Example 12 was used.

Comparative Example 1

Synthesis of Cathode Active Material Particles

Cathode active material particles A21 of Comparative Example 1 were obtained in the same manner as in Example 1.

Production of Lithium-Ion Secondary Battery

A lithium-ion secondary battery of Comparative Example 1 was produced in the same manner as in Example 1 except for the fact that the cathode active material particles A21 of Comparative Example 1 were used as the cathode material instead of the cathode material C1.

Comparative Example 2

Synthesis of Cathode Active Material Particles

Cathode active material particles A22 of Comparative Example 2 were obtained in the same manner as in Example 9.

Production of Lithium-Ion Secondary Battery

A lithium-ion secondary battery of Comparative Example 2 was produced in the same manner as in Example 1 except for the fact that the cathode active material particles A22 of Comparative Example 2 were used as the cathode material instead of the cathode material C1.

Example 13

Synthesis of Cathode Active Material Particles

Cathode active material particles A23 of Example 13 were obtained in the same manner as in Example 1.

Synthesis of Inorganic Phosphate Particles

Inorganic phosphate particles B23 of Example 13 were obtained in the same manner as in Example 1.

Mixing of Cathode Active Material Particles and Inorganic Phosphate Particles

The cathode active material particles A23 and the inorganic phosphate particles B23 were uniformly mixed together so that the mass of the inorganic phosphate particles B23 with respect to the cathode active material particles A23 (100 parts by mass) reached 0.1 parts by mass, and the obtained powder was considered as a cathode material for a lithium-ion secondary battery of Example 13 (cathode material C23).

Production of Lithium-Ion Secondary Battery

A lithium-ion secondary battery of Example 13 was produced in the same manner as in Example 1 except for the fact that the cathode material C23 of Example 13 was used instead of the cathode material C1.

Example 14

Synthesis of Cathode Active Material Particles

Cathode active material particles A24 of Example 14 were obtained in the same manner as in Example 1.

Synthesis of Inorganic Phosphate Particles

Inorganic phosphate particles B24 of Example 14 were obtained in the same manner as in Example 1.

Mixing of Cathode Active Material Particles and Inorganic Phosphate Particles

The cathode active material particles A24 and the inorganic phosphate particles B24 were uniformly mixed together so that the mass of the inorganic phosphate particles B24 with respect to the cathode active material particles A24 (100 parts by mass) reached 0.5 parts by mass, and the obtained powder was considered as a cathode material for a lithium-ion secondary battery of Example 14 (cathode material C24).

Production of Lithium-Ion Secondary Battery

A lithium-ion secondary battery of Example 14 was produced in the same manner as in Example 1 except for the fact that the cathode material C24 of Example 14 was used instead of the cathode material C1.

Example 15

Synthesis of Cathode Active Material Particles

Cathode active material particles A25 of Example 15 were obtained in the same manner as in Example 1.

Synthesis of Inorganic Phosphate Particles

Inorganic phosphate particles B25 of Example 15 were obtained in the same manner as in Example 1.

Mixing of Cathode Active Material Particles and Inorganic Phosphate Particles

The cathode active material particles A25 and the inorganic phosphate particles B25 were uniformly mixed together so that the mass of the inorganic phosphate particles B25 with respect to the cathode active material particles A25 (100 parts by mass) reached 3 parts by mass, and the obtained powder was considered as a cathode material for a lithium-ion secondary battery of Example 15 (cathode material C25).

Production of Lithium-Ion Secondary Battery

A lithium-ion secondary battery of Example 15 was produced in the same manner as in Example 1 except for the fact that the cathode material C25 of Example 15 was used instead of the cathode material C1.

Example 16

Synthesis of Cathode Active Material Particles

Cathode active material particles A26 of Example 16 were obtained in the same manner as in Example 1.

Synthesis of Inorganic Phosphate Particles

Inorganic phosphate particles B26 of Example 16 were obtained in the same manner as in Example 1.

Mixing of Cathode Active Material Particles and Inorganic Phosphate Particles

The cathode active material particles A26 and the inorganic phosphate particles B26 were uniformly mixed together so that the mass of the inorganic phosphate particles B26 with respect to the cathode active material particles A26 (100 parts by mass) reached 8.7 parts by mass, and the obtained powder was considered as a cathode material for a lithium-ion secondary battery of Example 16 (cathode material C26).

Production of Lithium-Ion Secondary Battery

A lithium-ion secondary battery of Example 16 was produced in the same manner as in Example 1 except for the fact that the cathode material C26 of Example 16 was used instead of the cathode material C1.

Example 17

Synthesis of Inorganic Phosphate Particles

Inorganic phosphate particles B27 of Example 17 were obtained in the same manner as in Example 1.

Synthesis of Cathode Active Material Precursor

Lithium phosphate ($Li_3PO_4$) (2 mol) and iron (II) sulfate ($FeSO_4$) (2 mol) were mixed into water (2 L (liters)) so that the total amount reached 4 L (liters), thereby preparing a homogeneous slurry-form mixture. The obtained mixture was stored in a pressure-resistant airtight container having a capacity of 8 L (liters) and was hydrothermally synthesized at 180° C. for one hour, thereby generating a precipitate. The generated precipitate was cleaned with water, thereby obtaining a cake-form precursor of a cathode active material.

Synthesis of Cathode Active Material Particles and Coating of Cathode Active Material Particle Surfaces with Inorganic Phosphate A polyethylene glycol (5.5 g) as the organic compound and zirconia balls (500 g) having a diameter of 5 mm as medium particles were mixed into the obtained precursor of the cathode active material (150 g in terms of solid contents), and a dispersion treatment was performed in a ball mill for 12 hours, thereby preparing a homogeneous slurry. The prepared slurry was sprayed in the atmosphere at 180° C. and dried, thereby obtaining a granulated body constituted of $LiFePO_4$ coated with the organic compound having an average particle diameter of 6 μm.

The obtained granulated body and the inorganic phosphate particles B27 of Example 17 were mixed together, the obtained mixture was calcinated in a non-oxidative gas atmosphere for one hour at 700° C. and then was held at 40° C. for 30 minutes, thereby obtaining $LiFePO_4$ having a conductive carbonaceous film and an inorganic phosphate coating (cathode active material particles A27).

The average primary particle diameter of the cathode active material particles A27 was 160 nm.

Production of Lithium-Ion Secondary Battery

A lithium-ion secondary battery of Example 17 was produced in the same manner as in Example 1 except for the fact that the cathode active material particles A27 of Example 17 were used as the cathode material instead of the cathode material C1.

Example 18

Synthesis of Cathode Active Material Precursor

Lithium phosphate ($Li_3PO_4$) (2 mol) and iron (II) sulfate ($FeSO_4$) (2 mol) were mixed into water (2 L (liters)) so that the total amount reached 4 L (liters), thereby preparing a homogeneous slurry-form mixture. The prepared mixture was stored in a pressure-resistant airtight container having a capacity of 8 L (liters) and was hydrothermally synthesized at 180° C. for one hour, thereby generating a precipitate. The generated precipitate was cleaned with water, thereby obtaining a cake-form precursor of a cathode active material.

Synthesis of Cathode Active Material Particles and Coating of Cathode Active Material Particle Surfaces with Inorganic Phosphate A polyethylene glycol (5.5 g) as the organic compound, an aqueous solution of phosphoric acid including phosphoric acid ($H_3PO_4$) (9.31 g), lithium carbonate ($Li_2CO_3$) (7.02 g), and zirconia balls (500 g) having a diameter of 5 mm as medium particles were mixed into the obtained precursor of the cathode active material (150 g in terms of solid contents), and a dispersion treatment was performed in a ball mill for 12 hours, thereby preparing a homogeneous slurry.

The prepared slurry was sprayed in the atmosphere at 180° C. and dried, thereby obtaining a granulated body constituted of $LiFePO_4$ coated with the organic compound having an average particle diameter of 6 μm.

The obtained granulated body was calcinated in a non-oxidative gas atmosphere for one hour at 700° C. and then was held at 40° C. for 30 minutes, thereby obtaining LiFePO$_4$ having a conductive carbonaceous film and an inorganic phosphate coating (cathode active material particles A28).

The average primary particle diameter of the cathode active material particles A28 was 180 nm.

Production of Lithium-Ion Secondary Battery

A lithium-ion secondary battery of Example 18 was produced in the same manner as in Example 1 except for the fact that the cathode active material particles A28 of Example 18 was used as the cathode material instead of the cathode material C1.

Example 19

Synthesis of Cathode Active Material Particles

Cathode active material particles A29 of Example 19 were obtained in the same manner as in Example 1.

Synthesis of Inorganic Phosphate Particles

Inorganic phosphate particles B29 of Example 19 were obtained in the same manner as in Example 1.

Production of Lithium-Ion Secondary Battery

A lithium-ion secondary battery of Example 19 was produced in the same manner as in Example 1 except for the fact that the cathode active material particles A27, the inorganic phosphate particles B27, polyvinylidene fluoride (PVdF) as a binding agent, and acetylene black (AB) as a conductive auxiliary agent were added to N-methyl-2-pyrrolidone (NMP) which was a solvent so that the mass ratio (the cathode active material A29/the inorganic phosphate particles B29/AB/PVdF) in paste reached 85.5:4.5:5:5, and the components were mixed together, thereby preparing cathode material paste (for the cathode).

Example 20

Synthesis of Cathode Active Material Particles

Cathode active material particles A30 of Example 20 were obtained in the same manner as in Example 1.

Synthesis of Inorganic Phosphate Particles

Phosphoric acid (H$_3$PO$_4$) (0.5 mol) and lithium carbonate (Li$_2$CO$_3$) (0.5 mol) were mixed into water (500 mL (milliliter)), thereby preparing a homogeneous slurry-form mixture. The prepared mixture was heated at 150° C. for one night so as to evaporate moisture, thereby drying the mixture. The dried mixture was calcinated in the atmosphere at 600° C. for 12 hours, thereby obtaining inorganic phosphate particles made of Li$_4$P$_2$O$_7$.

Next, the obtained inorganic phosphate particles (50 g), pure water (50 g), and zirconia balls (500 g) having a diameter of 5 mm as medium particles were mixed together, a crushing treatment was carried out using a ball mill for six hours, and the obtained slurry was dried in the atmosphere at 100° C. for 12 hours, thereby obtaining fine inorganic phosphate particles.

Next, the obtained fine inorganic phosphate particles were classified using a stainless steel sieve having a mesh of 45 μm, thereby obtaining Li$_4$P$_2$O$_7$ having a particle diameter of 45 μm or less (inorganic phosphate particles B30).

The average primary particle diameter of the inorganic phosphate particles B30 was 3 μm.

Production of Lithium-Ion Secondary Battery

A cathode of Example 20 was produced in the same manner as in Example 1 except for the fact that the cathode active material particles A30 of Example 20 were used as the cathode material instead of the cathode material C1.

Next, the inorganic phosphate particles B30 and polyvinylidene fluoride (PVdF) as a binding agent were added to N-methyl-2-pyrrolidone (NMP) which was a solvent so that the mass ratio (the inorganic phosphate particles B30/PVdF) in paste reached 95:5, and the components were mixed together, thereby preparing inorganic phosphate particle paste (for the inorganic phosphate particle layer).

Next, the inorganic phosphate particle paste was applied onto the surface of the cathode on which the cathode mixture layer was formed so as to form a coated film, and then this coated film was dried, thereby forming an inorganic phosphate particle layer on the cathode mixture layer surface. Next, the obtained cathode mixture layer/the inorganic phosphate particle layer were pressed. The amount of the inorganic phosphate particle paste applied was adjusted so that the thickness of the pressed inorganic phosphate particle layer reached 3 μm. The percentage by mass of the inorganic phosphate particles B30 with respect to the cathode active material A30 was 6.8%.

Next, an anode of Example 20 was produced in the same manner as in Example 1.

The produced cathode having the inorganic phosphate particle layer formed on the surface of the cathode mixture layer and the anode were made to face each other through a 25 μm-thick polypropylene separator, were immersed into a 1 M LiPF$_6$ solution (0.5 mL) as an electrolyte, and then was sealed with a laminate film, thereby producing a lithium-ion secondary battery of Example 1. As the LiPF$_6$ solution, a solution obtained by mixing ethylene carbonate and ethyl methyl carbonate so that the volume ratio reached 1:1 was used.

Example 21

Synthesis of Cathode Active Material Particles

Cathode active material particles A31 of Example 21 were obtained in the same manner as in Example 1.

Synthesis of Inorganic Phosphate Particles

Inorganic phosphate particles B31 of Example 21 were obtained in the same manner as in Example 1.

Production of Lithium-Ion Secondary Battery

A cathode of Example 21 was produced in the same manner as in Example 1 except for the fact that the cathode active material particles A31 of Example 21 were used as the cathode material instead of the cathode material C1.

Next, an anode of Example 21 was produced in the same manner as in Example 1.

Next, the inorganic phosphate particles B31 were mixed into a 1 M LiPF$_6$ solution as an electrolyte so that the content thereof reached 5.3% by mass of the mass of the cathode active material A31. As the LiPF$_6$ solution, a solution obtained by mixing ethylene carbonate and ethyl methyl carbonate so that the volume ratio reached 1:1 was used.

The produced cathode and anode were made to face each other through a 25 μm-thick polypropylene separator, were immersed into the electrolyte into which the above-described inorganic phosphate particles were mixed, and then were sealed with a laminate film, thereby producing a lithium-ion secondary battery of Example 21.

Example 22

Synthesis of Cathode Active Material Particles

Cathode active material particles A32 of Example 22 were obtained in the same manner as in Example 1.

Synthesis of Inorganic Phosphate Particles

Inorganic phosphate particles B32 of Example 22 were obtained in the same manner as in Example 20.

Production of Lithium-Ion Secondary Battery

A cathode of Example 22 was produced in the same manner as in Example 1 except for the fact that the cathode active material particles A32 of Example 22 were used as the cathode material instead of the cathode material C1.

Next, an anode of Example 22 was produced in the same manner as in Example 1.

Next, the inorganic phosphate particles B32 were mixed into pure water as a solvent so that the content thereof reached 20% by mass, thereby preparing an inorganic phosphate particle solution. Next, a 25 μm-thick polypropylene separator was immersed into this inorganic phosphate particle solution, and then the separator was removed and dried under reduced pressure at 70° C. for 12 hours, thereby producing a separator supporting the inorganic phosphate particles. The speed of removing the separator from the inorganic phosphate particle solution was adjusted so that the percentage by mass of the inorganic phosphate particles B32 with respect to the cathode active material A32 reached 5.3%.

The produced cathode and anode were made to face each other through the separator supporting the inorganic phosphate particles, were immersed into a 1 M LiPF$_6$ solution (0.5 mL) as an electrolyte, and then were sealed with a laminate film, thereby producing a lithium-ion secondary battery of Example 22. As the LiPF$_6$ solution, a solution obtained by mixing ethylene carbonate and ethyl methyl carbonate so that the volume ratio reached 1:1 was used.

Example 23

Synthesis of Cathode Active Material Particles

Cathode active material particles A33 of Example 23 were obtained in the same manner as in Example 1.

Synthesis of Inorganic Phosphate Particles

Inorganic phosphate particles B33 of Example 23 were obtained in the same manner as in Example 1.

Production of Lithium-Ion Secondary Battery

A cathode of Example 23 was produced in the same manner as in Example 1 except for the fact that the cathode active material particles A33 of Example 23 were used as the cathode material instead of the cathode material C1.

Next, natural graphite as an anode active material, the inorganic phosphate particles B33, styrene butadiene latex (SBR) as a binding agent, and carboxymethyl cellulose (CMC) as a viscosity-adjusting material were added to pure water which was a solvent so that the mass ratio (the natural graphite/the inorganic phosphate particles/SBR/CMC) in paste reached 90.5:7.5:1:1, and the components were mixed together, thereby preparing anode material paste (for the anode).

The prepared anode material paste (for the anode) was applied onto the surface of a 10 μm-thick copper foil (current collector) so as to form a coated film, and the coated film was dried, thereby forming an anode mixture layer on the surface of the copper foil. The coating thickness was adjusted so that the weight of the anode mixture layer reached 4.4 mg/cm$^2$. The anode mixture layer was pressed by a predetermined pressure so that the anode density reached 1.42 g/mL, and then a tetragonal piece having an anode area of 9.6 cm$^2$ was obtained by means of punching using a forming machine, thereby producing an anode of Example 23.

The produced cathode and anodes were made to face each other through a 25 μm-thick polypropylene separator, were immersed in a 1 M LiPF$_6$ solution (0.5 mL) as an electrolyte, and then was sealed with a laminate film, thereby producing a lithium-ion secondary battery of Example 23. As the LiPF$_6$ solution, a solution obtained by mixing ethylene carbonate and ethyl methyl carbonate so that the volume ratio reached 1:1 was used.

Evaluation of Lithium-Ion Secondary Batteries

On the lithium-ion secondary batteries of Examples 1 to 23 and Comparative Example 1 and 2, charging and discharging tests and overcharging tests were performed as described below.

1. Cycle Test

Constant-current charging at a current value of 2 C until the battery voltage reached 4.1 V and subsequent discharging at a current value of 2 C until the battery voltage reached 2 V in an environment of 60° C. was considered as one cycle, and when, in the cycle, the charge capacity obtained by the constant-current charging at a current value of 2 C until the battery voltage reached 4.1 V was considered as the charge capacity A, and the discharge capacity obtained by the subsequent discharging at a current value of 2 C until the battery voltage reached 2 V was considered as the discharge capacity B, the integral value obtained by integrating the difference between the discharge capacity B and the charge capacity A (the discharge capacity B–the charge capacity A) in the cycle over 500 cycles was evaluated as the integral irreversible capacity and is shown in Table 1.

In addition, the discharge capacity B at the first cycle was evaluated as the discharge capacity.

In addition, the ratio of the discharge capacity B at the 500$^{th}$ cycle as the numerator to the discharge capacity B at the first cycle as the denominator was evaluated as the capacity retention.

2. Anode Fe Quantitative Test

The pouch cell after 500 cycles in the cycle test 1 was opened in the atmosphere, and the anode was washed with diethyl carbonate (DEC) (3 g) and then was dried at 50° C. in a vacuum for 12 hours. Next, graphite on the dried anode was exfoliated using a ceramic spatula, and all the graphite on the anode was collected. Next, the collected graphite was put into a platinum crucible, the crucible was closed with a lid, and the graphite was gradually heated to 700° C. in an electric furnace, thereby carbonizing the specimen. Next, lithium tetraborate was added to the carbonized specimen and was heated up to 925° C. in an electric furnace so as to be melted. Next, the molten specimen in the platinum crucible was put into a tall beaker, hot water and nitric acid were added thereto, and the components were stirred and dissolved. This solution was used as a test liquid, and the amount of Fe was measured by means of ICP-AES. The ratio of Fe in the obtained anode (the mass of Fe/the total mass of graphite on the anode after 500 cycles) was evaluated as the amount of Fe in the anode [mg/kg].

Evaluation Results

The evaluation results of the lithium-ion secondary batteries of Examples 1 to 23 and Comparative Examples 1 and 2 are shown in Table 1.

In addition, the changes in the integral irreversible capacity values in the cycle tests in Example 1 and Comparative Example 1 are illustrated in FIG. 1. The curves illustrated in FIG. 1 are the change curves of the integral irreversible capacity values with the vertical axis indicating the integral irreversible capacity [mAh/g] and the horizontal axis indicating the number of cycles. In FIG. 1, the solid line indicates the change in the integral irreversible capacity value in the cycle test in Example 1, and the dotted line indicates the change in the integral irreversible capacity value in the cycle test in Comparative Example 1.

In addition, in Table 1, whether or not the cathode active material particles were coated with the inorganic phosphate particles is shown in the column of "presence or absence of inorganic phosphate particle coating". Cathode active material particles coated with inorganic phosphate particles are indicated as "Present".

TABLE 1

| | Cathode active material particles (A) | Inorganic phosphate particles (B) | Place in which inorganic phosphate particles are present (addition method) | Amount of (B) with respect to 100 parts by mass (A) [parts by mass] | Presence or absence of inorganic phosphate particle coating | Amount of Fe in anode [mg/kg] | Discharge capacity [mAh/g] | Integral irreversible capacity [mAh/g] | Capacity retention [%] |
|---|---|---|---|---|---|---|---|---|---|
| Example 1 | LiFePO$_4$ | Li$_4$P$_2$O$_7$ | Cathode (mixed before paste production) | 5.3 | Absent | 210 | 115 | 43 | 80 |
| Example 2 | LiFePO$_4$ | Li$_4$P$_2$O$_7$ | Cathode (mixed before paste production) | 1 | Absent | 701 | 119 | 68 | 74 |
| Example 3 | LiFePO$_4$ | Li$_3$PO$_4$ | Cathode (mixed before paste production) | 5.3 | Absent | 677 | 115 | 72 | 73 |
| Example 4 | LiFePO$_4$ | Li$_3$PO$_4$ | Cathode (mixed before paste production) | 1 | Absent | 1179 | 118 | 96 | 70 |
| Example 5 | LiFePO$_4$ | LiPO$_3$ | Cathode (mixed before paste production) | 5.3 | Absent | 322 | 114 | 48 | 79 |
| Example 6 | LiFePO$_4$ | LiPO$_3$ | Cathode (mixed before paste production) | 1 | Absent | 815 | 120 | 81 | 72 |
| Example 7 | LiFePO$_4$ | Amorphous LiPO$_3$ | Cathode (mixed before paste production) | 5.3 | Absent | 253 | 116 | 45 | 81 |
| Example 8 | LiFePO$_4$ | Amorphous LiPO$_3$ | Cathode (mixed before paste production) | 1 | Absent | 792 | 120 | 71 | 74 |
| Example 9 | LiMn$_{0.7}$Fe$_{0.3}$PO$_4$ | Li$_4$P$_2$O$_7$ | Cathode (mixed before paste production) | 5.3 | Absent | 290 | 109 | 51 | 78 |
| Example 10 | LiMn$_{0.7}$Fe$_{0.3}$PO$_4$ | Li$_3$PO$_4$ | Cathode (mixed before paste production) | 5.3 | Absent | 934 | 109 | 96 | 71 |
| Example 11 | LiMn$_{0.7}$Fe$_{0.3}$PO$_4$ | LiPO$_3$ | Cathode (mixed before paste production) | 5.3 | Absent | 466 | 110 | 63 | 75 |
| Example 12 | LiMn$_{0.7}$Fe$_{0.3}$PO$_4$ | Amorphous LiPO$_3$ | Cathode (mixed before paste production) | 5.3 | Absent | 315 | 108 | 49 | 78 |
| Example 13 | LiFePO$_4$ | Li$_4$P$_2$O$_7$ | Cathode (mixed before paste production) | 0.1 | Absent | 1542 | 121 | 152 | 61 |
| Example 14 | LiFePO$_4$ | Li$_4$P$_2$O$_7$ | Cathode (mixed before paste production) | 0.5 | Absent | 1121 | 119 | 89 | 67 |
| Example 15 | LiFePO$_4$ | Li$_4$P$_2$O$_7$ | Cathode (mixed before paste production) | 3 | Absent | 453 | 117 | 57 | 77 |
| Example 16 | LiFePO$_4$ | Li$_4$P$_2$O$_7$ | Cathode (mixed before paste production) | 8.7 | Absent | 176 | 82 | 39 | 82 |
| Example 17 | LiFePO$_4$ | Li$_4$P$_2$O$_7$ | Cathode (mixed before paste production) | 5.3 | Present | 1423 | 114 | 148 | 63 |
| Example 18 | LiFePO$_4$ | Li$_4$P$_2$O$_7$ | Cathode (mixed before paste production) | 5.3 | Present | 1541 | 115 | 149 | 60 |
| Example 19 | LiFePO$_4$ | Li$_4$P$_2$O$_7$ | Cathode (mixed during paste production) | 5.3 | Absent | 218 | 115 | 42 | 80 |
| Example 20 | LiFePO$_4$ | Li$_4$P$_2$O$_7$ | Inorganic phosphate particle layer | 6.8 | Absent | 327 | 121 | 47 | 74 |
| Example 21 | LiFePO$_4$ | Li$_4$P$_2$O$_7$ | Electrolyte | 5.3 | Absent | 567 | 120 | 51 | 75 |
| Example 22 | LiFePO$_4$ | Li$_4$P$_2$O$_7$ | Separator | 5.3 | Absent | 487 | 121 | 49 | 76 |
| Example 23 | LiFePO$_4$ | Li$_4$P$_2$O$_7$ | Anode (mixed during paste production) | 5.3 | Absent | 393 | 120 | 58 | 73 |
| Comparative Example 1 | LiFePO$_4$ | None | — | — | Absent | 1605 | 121 | 156 | 59 |
| Comparative Example 2 | LiMn$_{0.7}$Fe$_{0.3}$PO$_4$ | None | — | — | Absent | 1974 | 116 | 201 | 57 |

From the results of Table 1, when Examples 1 to 12 and Comparative Examples 1 and 2 are compared with each other, it could be confirmed that, in the lithium-ion secondary batteries of Examples 1 to 12 to which the inorganic phosphate particles were added, compared with the lithium-ion secondary batteries of Comparative Examples 1 and 2 to which the inorganic phosphate particles were not added, the amount of Fe in the anode decreased, the integral irreversible capacity decreased, and the capacity retention was 60% or higher.

In addition, when Examples 1 and 2 and Examples 13 to 16 are compared with each other, it was possible to confirm a tendency that, as the mass ratio (the inorganic phosphate particles/the cathode active material particles) increased, the amount of Fe in the anode decreased and the integral irreversible capacity decreased, and it was also possible to confirm a tendency that the discharge capacity decreased. The decrease in the discharge capacity is considered to be attributed to two facts that the excessive increase in the fraction of the inorganic phosphate particles having low electron conductivity excessively impaired the electron conductivity of the cathode mixture layer and, simply, the inorganic phosphate particles being electrochemically inactive decreased the capacity.

In addition, when Example 1 and Examples 17 and 18 are compared with each other, it was found that, in Examples 17 and 18 having a form of the cathode active material particle surfaces being coated with the inorganic phosphate, the amounts of Fe in the anode were great, and the effect of suppressing transition metal being eluted from the cathode was not sufficiently exhibited.

In addition, when Examples 19 to 23 and Comparative Example 1 are compared with each other, it is found that the amount of Fe in the anode could be decreased even when the inorganic phosphate particles were mixed thereinto during the production of the cathode material paste, the amount of Fe in the anode could be decreased even when the inorganic phosphate particle layer was formed between the cathode and the separator, the amount of Fe in the anode could be decreased even when the inorganic phosphate particles were mixed into the electrolyte, the amount of Fe in the anode could be decreased even when the inorganic phosphate particles were supported by the separator, and the amount of Fe in the anode was decreased even when the inorganic phosphate particles were mixed thereinto during the production of the anode material paste. This is considered to imply that, when it is possible to dispose inorganic phosphate particles at places through which transition metal ions eluted from the cathode are capable of passing, it is possible to decrease the amount of transition metal which is eluted from the cathode and reaches the anode regardless of places in which the inorganic phosphate particles are present.

In addition, from the results of Table 1, it is found that, in the lithium-ion secondary battery of Example 1, the irreversible capacity exhibited a tendency of increasing only in the initial phase of the cycle, which implies that only a small amount of Fe was eluted from the cathode, and thus it is found that the lithium-ion secondary battery had excellent characteristics. However, it is found that, in the lithium-ion secondary battery of Comparative Example 1, the irreversible capacity was continuously generated throughout the cycle, which implies that a large amount of Fe was eluted from the cathode, and thus it is found that the characteristics of the lithium-ion secondary battery were poorer than in Example 1.

The lithium-ion secondary battery of the present invention is capable of suppressing transition metal being eluted from the cathode, and thus has excellent long-term cycle characteristics, is capable of improving stability and safety and significantly contributing to the advancement of the reliability of lithium-ion secondary batteries mainly in usage for moving vehicles.

What is claimed is:

1. A lithium-ion secondary battery comprising:
    a cathode;
    an anode; and
    an electrolyte,
    wherein the cathode includes coated cathode active material particles which include
        central particles made of $Li_xA_yM_zPO_4$ ($0 \leq x \leq 1.1$, $0.8 \leq y \leq 1.1$, and $0 \leq z \leq 0.2$; here, A represents at least one element selected from the group consisting of Fe, Mn, Co, and Ni, and M represents at least one element selected from the group consisting of Mg, Ca, Co; Sr, Ba, Ti, Zn, B, Al, Ga, In; Si, Ge, and rare earth elements)
        a carbonaceous film that coats surfaces of the central particles; and
    the cathode consists of composite particles in which the coated cathode active material particles are attached to surfaces of lithium phosphate particles, wherein
        either the central particles are in contact with the lithium phosphate particles, or
        the carbonaceous film coating the central particles is in contact with the lithium phosphate particles, or
        both the central particles and the carbonaceous film coating the central particles are in contact with the lithium phosphate particles.

2. The lithium-ion secondary battery according to claim 1, wherein an average primary particle diameter of the coated cathode active material particles is 10 nm or more and 700 nm or less, and an average primary particle diameter of the lithium phosphate particles is 0.5 µm or more and 75 µm or less.

3. The lithium-ion secondary battery according to claim 1, wherein a content of the lithium phosphate particles in the cathode is 0.1 parts by mass or more and 10 parts by mass or less with respect to 100 parts by mass of the coated cathode active material particles.

4. The lithium-ion secondary battery according to claim 1, wherein the lithium phosphate particles are represented by $Li_\alpha P_\beta O_\gamma$ ($0 < \alpha \leq 3$, $0 < \beta \leq 2$, $0 < \gamma \leq 4$, $0.5 \leq \alpha/\beta \leq 3.5$).

* * * * *